(No Model.)
R. W. FURNAS.
ICE CREAM FREEZER.
No. 280,734. Patented July 3, 1883.
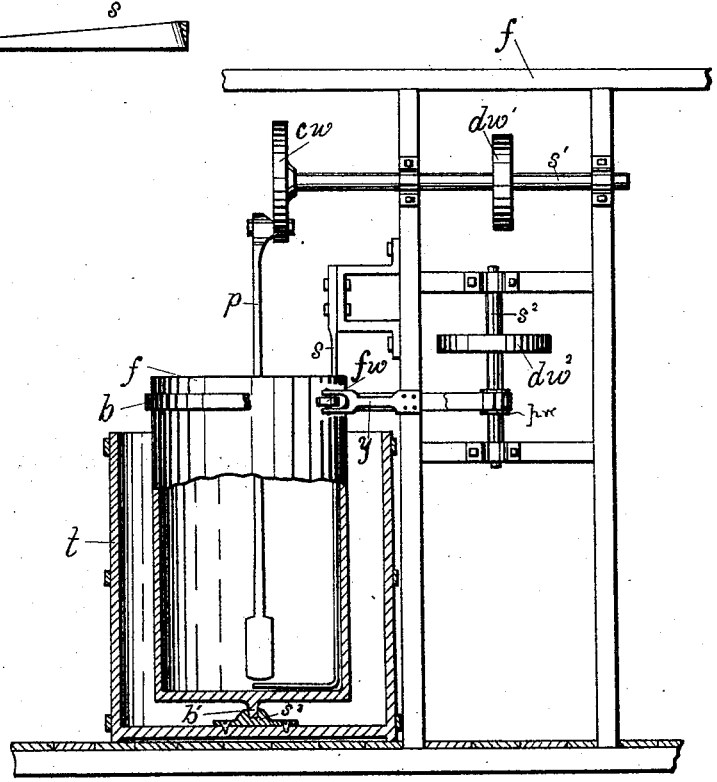
WITNESSES.
E. E. Bickler.
C. S. Spritz.
INVENTOR.
Robt W. Furnas
By C. P. Jacobs
Atty.

UNITED STATES PATENT OFFICE.

ROBERT W. FURNAS, OF INDIANAPOLIS, INDIANA.

ICE-CREAM FREEZER.

SPECIFICATION forming part of Letters Patent No. 280,734, dated July 3, 1883.

Application filed April 14, 1883. (No model.)

*To all whom it may concern:*

Be it known that I, ROBERT W. FURNAS, of Indianapolis, in the county of Marion and State of Indiana, have invented a new and useful Improvement in Ice-Cream Freezers, of which the following is a description, reference being made to the accompanying drawings.

My invention is designed to provide means for stirring the cream in an open freezer, and to prevent the cream from adhering to the sides and bottom, and will be understood by the following description.

In the drawings, Figure 1 is a side view of my machine, partly in section; Fig. 2, an enlarged front view of the paddle and crank-wheel; and Fig. 3 is an enlarged plan view of the foot of the scraper, with its perpendicular arm in cross-section.

In detail, $t$ is the ice-tub, with a socket, $s^3$, on the bottom, in which is the bearing $b'$ of the freezer $f$, on which it revolves by means of a belt, $b$, which passes round the top of the freezer and around a small pulley-wheel, $p\,w$, mounted on the shaft $s^2$, which also carries its driving-wheel $d\,w^2$. Power being applied to this wheel $d\,w^2$, the freezer is made to revolve at any desired rate of speed. The shaft $s^2$ has bearings in boxes supported by cross-beams in the common frame-work $f$, which also supports another shaft, $s'$, which carries its driving-wheel $d\,w'$, and on the farther end is mounted a crank-wheel, $c\,w$, and on a wrist-pin attached to the crank-wheel is mounted a plunger or paddle, $p$, which works up and down in a vertical plane as the crank-wheel revolves. The end of this paddle is nearly triangular in shape on a side view, (see Fig. 2,) and the result is that both going down and up the cream, pressing against the upper and lower inclines, crowds the paddle toward and keeps it against the side of the can, so that it not only stirs the cream, but acts as an additional scraper. The driving-wheel $d\,w'$ is driven by a belt from the engine, and the driving-wheel $d\,w^2$ is driven by similar means. These driving-wheels revolve with different velocities, it being desirable that $d\,w^2$ should move more slowly than $d\,w'$.

A scraper, S, (shown enlarged in Fig. 3,) is fastened firmly to a support connected with the main frame $f$, and extends downward into and close to the side of the freezer, and its foot is turned out at right angles, so as to fit closely to the bottom of the freezer. This scraper $s$ is preferably made with an edge, and triangular in shape in cross-section, (see Fig. 3,) and being rigidly connected to the frame, as the freezer revolves every part of the sides and bottom of the freezer is scraped clean and free of any cream that would otherwise adhere to it, while at the same time the plunger $p$ is rising and falling and keeping the mixture well stirred in the portions of the freezer next to the side one-fourth away round from the scraper $s$. This arrangement requires the process to be carried on in open freezers, and this, indeed, is desirable, because my device acts uniformly and thoroughly, and the operator can keep his eye constantly upon the mixture and stop the machinery at any moment. The stirring of the cream by hand is irregular, uncertain, and the product is not smooth or uniform in color, texture, or taste.

Friction-wheels $f\,w$, journaled in yokes $y$, are placed on each side to steady and ease the movement of the freezer as it revolves. In Fig. 1 the belt $b$ is cut away to show the arrangement of these friction-rollers.

What I claim, and desire to secure by Letters Patent, is the following:

1. In an ice-cream freezer, the right-angled scraper $s$, attached to the frame above the freezer and passing down into it, and adapted to scrape the cream from the sides and bottom as the freezer is revolved, substantially as described.

2. In an ice-cream freezer, the combination of an ice-tub or freezing-can open at the top, a scraper with foot at right angles to the main stem, rigidly attached to a frame outside and above the freezing-can, a stirring and scraping paddle adapted to move up and down in the freezing-can and against the sides thereof as the can is revolved, and actuated by suitable mechanism, substantially as and for the purpose described.

In witness whereof I have hereunto set my hand this 31st day of March, 1883.

ROBERT W. FURNAS.

Witnesses:
C. P. JACOBS,
C. S. SPRITZ.